United States Patent
Vokaliga et al.

(10) Patent No.: US 10,146,648 B1
(45) Date of Patent: Dec. 4, 2018

(54) PRESERVING DISASTER RECOVERY PROTECTION FOR A DATA STORAGE OBJECT

(71) Applicant: EMC IP HOLDING COMPANY LLC, Hopkinton, MA (US)

(72) Inventors: Deepak Vokaliga, Hopkinton, MA (US); Sandeep Chandrashekara, Hopkinton, MA (US); Benjamin Yoder, Westborough, MA (US); Deepika Kini, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 152 days.

(21) Appl. No.: 15/281,599

(22) Filed: Sep. 30, 2016

(51) Int. Cl.
| | |
|---|---|
| *G06F 11/20* | (2006.01) |
| *G06F 3/06* | (2006.01) |
| *G06F 11/14* | (2006.01) |
| *H04L 29/08* | (2006.01) |

(52) U.S. Cl.
CPC .......... *G06F 11/2017* (2013.01); *G06F 3/065* (2013.01); *G06F 3/067* (2013.01); *G06F 3/0619* (2013.01); *G06F 3/0647* (2013.01); *G06F 11/1464* (2013.01); *H04L 67/1095* (2013.01); *G06F 2201/84* (2013.01)

(58) Field of Classification Search
CPC .............................. G06F 11/20; G06F 11/2017
USPC ...................................................... 714/6.21
See application file for complete search history.

(56) References Cited

U.S. PATENT DOCUMENTS

| | | | | |
|---|---|---|---|---|
| 6,178,521 B1 * | 1/2001 | Filgate | ............... | G06F 11/2058 711/161 |
| 7,000,086 B2 * | 2/2006 | Meiri | ............... | G06F 3/061 700/82 |
| 7,680,997 B1 * | 3/2010 | Specht | ............... | G06F 11/26 711/162 |
| 8,335,899 B1 * | 12/2012 | Meiri | ............... | G06F 11/2076 711/162 |
| 8,412,977 B2 * | 4/2013 | Fujibayashi | ............... | G06F 11/2069 714/6.1 |
| 8,874,508 B1 | 10/2014 | Mittal | | |
| 9,015,561 B1 * | 4/2015 | Hu | ............... | G11C 16/0483 714/773 |
| 9,880,946 B1 * | 1/2018 | Yoder | ............... | G06F 12/121 |

OTHER PUBLICATIONS

"What is Active/Active?" The Availability Digest, Oct. 2006, pp. 1-5.

* cited by examiner

*Primary Examiner* — Kamini B Patel
(74) *Attorney, Agent, or Firm* — BainwoodHuang (57) ABSTRACT

Replication of a storage object to a remote storage array is seamlessly maintained by i) while write operations directed to the storage object are being collected into a set of write cycles that are stored in a master storage array, also collecting the write operations directed to the storage volume into a set of write cycles stored in a slave storage array, and ii) in response to detecting a failure of the master storage array, and while the host computer continues to access the storage object using a copy of the storage object located in the slave storage array, transmitting the write cycles stored in the slave storage array to the remote storage array, so that the remote storage array can apply the write operations in the write cycles it receives from the slave storage array on the copy of the storage object contained in the remote storage array.

17 Claims, 6 Drawing Sheets

PRESERVING DISASTER RECOVERY PROTECTION FOR A DATA STORAGE OBJECT

BACKGROUND

As it is generally known, a data storage array contains one or more non-volatile storage devices, such as magnetic disk drives, electronic flash drives, and/or optical drives, and is used by one or more host machines to store and retrieve data on the non-volatile storage devices contained therein. Specifically, storage arrays service host I/O operations that arrive from the host machine and that specify logical storage objects that are to be written, read, created, or deleted. Storage arrays include hardware and software that receives and manages incoming host I/O operations, and that organizes and secures the host data that is stored on behalf of the host machine on the non-volatile storage devices contained in the storage arrays.

Fault tolerance is an important consideration for data storage systems. Some previous systems have operated to replicate logical storage objects across multiple storage arrays, in order to provide certain kinds of fault tolerance.

SUMMARY

Unfortunately, previous systems for providing replication of logical data objects across multiple storage arrays have exhibited significant shortcomings. For example, some previous systems have operated by allowing a host machine to access a data object through a primary local storage array, while replicating the data object from the primary storage array to a backup local storage array, and while providing disaster recovery support by also replicating the storage object to a geographically distant storage array. In these previous systems, in the event that the primary local storage array failed, the host machine accessing the storage object had to be restarted in order to establish access from the host machine to the copy of the storage object maintained on the backup storage array. These previous systems also required that, in order to handle a failure of the primary local storage array, a host process (e.g. on the host machine performing the I/O operations or on some other host machine) was required to keep track of the host write data that had been received by the primary storage array but not yet been completely conveyed to the geographically distant storage array, for use when the primary storage array failed, so that the un-conveyed data could then be conveyed to the geographically distant storage array, in order to re-establish disaster recovery support under control of the host machine. For many operational environments, requiring that either a host machine be restarted when the primary local storage array fails, and/or that a host process keep track of the received host write data not yet completely conveyed to the geographically distant storage array, is highly undesirable in terms of lost performance when the host machine is restarted, and in terms of resources used on a host machine to keep track of the un-conveyed data.

In other previous systems, the host machine has been able to access different copies of the storage object on different local storage arrays during normal operation, in an "active/active" configuration, with the intent of allowing substantially continuous access to the storage object in the event of a local storage array failure. However, previous active/active arrangements of storage arrays have not provided the ability to seamlessly re-establish disaster recovery protection with a geographically remote storage array after failure of a local storage array, without completely copying the logical storage object from the non-failing local storage array to the geographically remote storage array. In the case of large storage objects, such a potentially massive copy operation is prohibitively time consuming and network resource intensive.

To address these and other shortcomings of previous systems, improved techniques are disclosed herein for seamlessly preserving disaster recovery protection for a storage object in the event of a local storage array failure. In the disclosed system, during an initial time period, while write operations from a host computer and directed to the storage object are collected into a set of write cycles that are stored in a first local storage array referred to herein as the "master" storage array, and while the write cycles stored in the master storage array are transmitted to a remote storage array and applied to a copy of the storage object stored in the remote storage array to provide replication of the storage object on the remote storage array, a second local storage array referred to herein as the "slave" storage array collects the write operations received from the host computer and directed to the storage object into a set of write cycles stored in the slave storage array.

After the initial time period, and while the host computer continues to access the storage object using a copy of the storage object stored in the slave storage array, a failure of the master storage array is detected. In response to detecting the failure of the master storage array, the write cycles in the slave storage array are transmitted to the remote storage array and the write operations in the write cycles transmitted from the slave storage array are applied on the copy of the storage object stored in the remote storage array, in order to seamlessly maintain replication of the storage object on the remote storage array.

In another aspect of the disclosed techniques, synchronous replication of the storage object may be performed on the master storage array and the slave storage array at least in part by, for each write operation received from the host computer and directed to the storage object, applying the write operation on both i) a copy of the storage object stored in the master storage array, and ii) the copy of the storage object stored in the slave storage array, prior to acknowledging completion of the write operation to the host computer.

In another aspect of the disclosed techniques, the master storage array and the slave storage array may both be operable to receive write operations directed to the storage object. In such an embodiment, applying each write operation from the host computer and directed to the storage object may include applying both i) at least one write operation from the host computer and directed to the storage object that is received by the master storage array and ii) at least one write operation from the host computer and directed to the storage object that is received by the slave storage array, on both i) the copy of the storage object stored in the master storage array, and ii) the copy of the storage object stored in the slave storage array.

In another aspect of the disclosed techniques, collecting write operations from the host computer and directed to the storage object into the set of write cycles stored in the master storage array includes collecting both i) write operations directed to the storage object received by the master storage array, and ii) write operations directed to the storage object received by the slave storage array, into the set of write cycles stored in the master storage array, and collecting write operations from the host computer and directed to the storage object into the set of write cycles stored in the slave storage array includes collecting both i) write operations from the host computer and directed to the storage object received by the master storage array, and ii) write operations from the host computer and directed to the storage object received by the slave storage array, into the set of write cycles stored in the slave storage array.

In another aspect of the disclosed techniques, the master storage array associates sequential cycle numbers with the write cycles stored in the master storage array as those write cycles are collected, and the slave storage array associates the same sequential cycle numbers with the write cycles stored in the slave storage array as those write cycles are collected. While received write operations are being collected into the write cycles stored in the master storage array and also into the write cycles stored in the slave storage array, the master storage array controls the times at which the cycle number changes in both the master storage array and the slave storage array. This is accomplished by, in response to a new cycle trigger condition, incrementing the cycle number on the master storage array, and then sending a new cycle number command to the slave storage array that causes the slave storage array to increment the cycle number on the slave storage array. Incrementing the cycle number on the master storage array, and sending the new cycle number command from the master storage array to the slave storage array causing the slave storage array to increment the cycle number on the slave storage array may, for example, be triggered by a new cycle trigger condition consisting of a cycle period timer expiring on the master storage array.

In another aspect of the disclosed techniques, when the master storage array receives an indication from the remote storage array that all write operations in a write cycle transmitted to the remote storage array from the master storage array have been successfully received, the master storage array discards that write cycle from the write cycles stored in the master storage array, and transmits a discard command to the slave storage array. Receipt of the discard command by the slave storage array causes the slave storage array to discard a write cycle in the write cycles stored in the slave storage array that is associated with a cycle number that is one less than the cycle number of the write cycle that was successfully received by the remote storage array from the master storage array. The set of write cycles stored in the slave storage array may accordingly be maintained such that it contains at least one more write cycle than is contained in the set of write cycles stored in the master storage array.

In another aspect of the disclosed techniques, transmitting write cycles from the slave storage array to the remote storage array when there is a failure in the master storage array includes transmitting, from the slave storage array to the remote storage array as a single write cycle, i) a write cycle associated with a lowest cycle number in the slave storage array together with ii) a write cycle associated with a second lowest cycle number in the slave storage array.

In another aspect of the disclosed techniques, the remote storage array is operable to detect failure of the master storage array, and to transmit a failure message to the slave storage array indicating that the master storage array has failed. Detecting the failure of the master storage array may then include or consist of the slave storage array receiving a failure message from the remote storage array at the slave storage array.

Embodiments of the disclosed techniques may provide significant advantages over previous approaches. For example, in contrast to some previous systems in which failure of a primary local storage array required that the host machine accessing the storage object be restarted in order to establish a new access path to a copy of storage object on a backup storage array, the disclosed system may be embodied such that the master storage array and slave storage array provide active/active access to the storage object, using synchronously replicated copies of the storage object, such that host access to the storage object may continue without interruption using the copy of the storage object on the slave storage array in the event that the master storage array fails. As a result of the seamless continuation of asynchronous replication that the disclosed system may automatically provide in the event of a master storage array failure, there is no requirement that a host process maintain or determine the specific data that had not yet been completely conveyed to the geographically distant storage array in order to re-establish disaster recovery protection. Moreover, unlike previous active/active arrangements of storage arrays, the disclosed techniques may be embodied such that seamless continuation of asynchronous replication is provided in the event that the master storage array fails, without the negative performance impact caused by copying of the entire storage object from a surviving local storage array to the geographically remote storage array.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the invention hereof is broader than the specific example embodiments disclosed.

The techniques for seamlessly preserving disaster recovery protection for a storage object described herein include, during an initial time period, while write operations from a host computer and directed to the storage object are collected into a set of write cycles stored in a local storage array referred to herein as the "master" storage array, and while the write cycles stored in the master storage array are transmitted to a remote storage array and applied to a copy of the storage object stored in the remote storage array in order to provide replication of the storage object on the remote storage array, also collecting the write operations from the host computer and directed to the storage object into a set of write cycles stored in another local storage array referred to herein as the "slave" storage array. After the initial time period, and while the host computer continues to access the storage object using a copy of the storage object stored in the slave storage array, a failure of the master storage array is detected.

In response to detecting the failure of the master storage array, the slave storage array transmits the write cycles stored in the slave storage array to the remote storage array, in order for the remote storage array to apply the write operations in the write cycles transmitted from the slave storage array on the copy of the storage object stored in the remote storage array to maintain replication of the storage object on the remote storage array.

Figure 1:
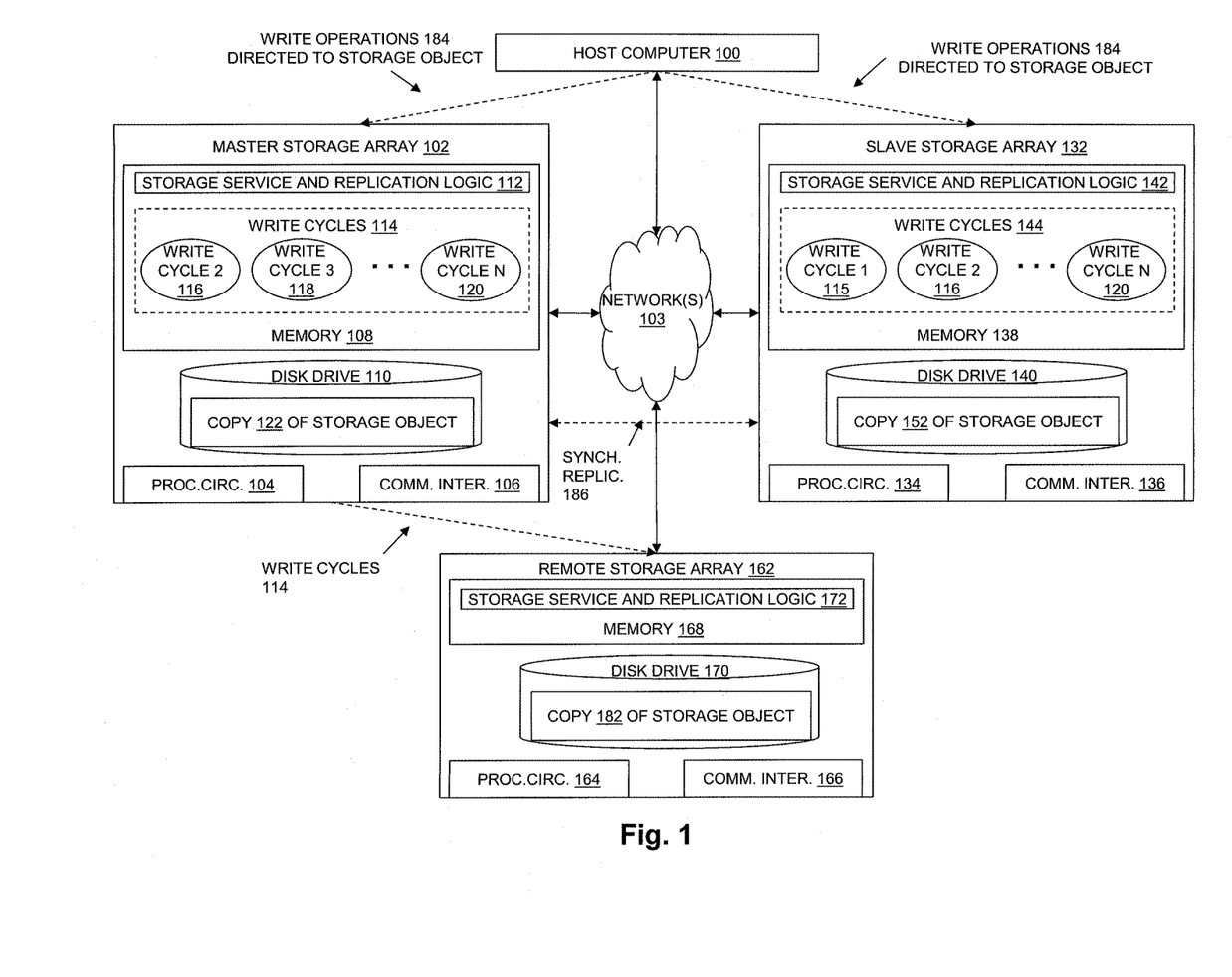
FIG. 1 is a block diagram of an example of a data storage environment including components of an embodiment of the disclosed techniques, while operating during an initial time period.

FIG. 1 is a block diagram showing an example of a data storage environment including components of an embodiment of the disclosed techniques, during an initial time period, prior to detection of a failure of or in the Master Storage Array 102. As shown in FIG. 1, a Host Computer 100, Master Storage Array 102, Slave Storage Array 132, and Remote Storage Array 162 are communicably connected over one or more communication networks, shown by Network(s) 103. Network(s) 103 may consist of or include any specific type of communication network or networks, such as a local area network (LAN), and/or a wide area network (WAN) such as the Internet, etc. In one example, Master Storage Array 102 and Slave Storage Array 132 are considered "local" in that they are located in relatively close geographic proximity to Host Computer 100, e.g. within the same building, campus, city, town, etc. In such an example, Remote Storage Array 162 may be considered "remote", in that it is located at a significantly greater geographic distance from Host Computer 100, e.g. in another county, state, country, etc. Locating Remote Storage Array 162 geographically remotely from Master Storage Array 102 and Slave Storage Array 132 may provide disaster recovery protection, in that Remote Storage Array 162 is less likely to be adversely affected (e.g. destroyed, caused to fail, etc.) by certain types of disasters (e.g. earthquakes, other natural disasters) that have an impact proximate to Master Storage Array 102 and Slave Storage Array 132, and that accordingly may cause destruction or failure of Master Storage Array 102 and Slave Storage Array 132, but not Remote Storage Array 162. Advantageously, data replicated onto Remote Storage Array 162 may survive a disaster that causes the loss of data stored on Master Storage Array 102 and Slave Storage Array 132.

As shown in FIG. 1, each of the storage arrays includes at least one non-volatile storage device, processing circuitry, one or more communication interfaces, and memory. Specifically, Master Storage Array 102 includes Disk Drive 110, Processing Circuitry 104, Communication Interfaces 106, and Memory 108, Slave Storage Array 132 includes Disk Drive 140, Processing Circuitry 134, Communication Interfaces 136, and Memory 138, and Remote Storage Array 162 includes Disk Drive 170, Processing Circuitry 164, Communication Interfaces 166, and Memory 168.

Disk Drives 110, 140 and 170 may each include or consist of one or more magnetic disk drives, electronic flash drives, and/or optical drives. Communication Interfaces 106, 136 and 166 each enable the respective storage arrays to communicate over Network(s) 103, and may each include, for example, one or more network interface adapters for transmitting and/or receiving electronic and/or optical signals over Network(s) 103. Processing Circuitry 104, 134 and 164 may, for example, each include or consist of one or more microprocessors, e.g. central processing units (CPUs), multi-core processors, chips, and/or assemblies, and associated circuitry. Memories 108, 138 and 168 may each include volatile memory (e.g., RAM), and/or non-volatile memory, such as one or more ROMs, disk drives, solid state drives, and the like. The processing circuitry and memory within each storage array form control circuitry, which is constructed and arranged to carry out various methods and functions as described herein. The Memories 108, 138, and 168 may store a variety of software components that may be provided in the form of executable program code. For example, as shown in FIG. 1, Memory 108 may include software components such as Storage Service and Replication Logic 112, Memory 138 may include software components such as Storage Service and Replication Logic 142, and Memory 168 may include software components such as Storage Service and Replication Logic 172. When the program code in each storage array is executed by processing circuitry in the storage array, the processing circuitry may be caused to carry out the operations of the software components, and to carry out the methods and functions as described herein. Storage Service and Replication Logic 112, 142 and/or 172 may alternatively be embodied as firmware, microcode, and/or hardware circuitry operable to carry out the methods and functions described herein. Although certain software components are shown and described for purposes of illustration and explanation, those skilled in the art will recognize that the Memories 108, 138 and 168 may additionally or alternatively include various other software components, such as an operating system, and various other applications, processes, etc.

Host Computer 100 may consist of or include any specific type of computer, computer system, or group of computers, that is operable to issue I/O operations, such as I/O write operations and/or I/O read operations, etc., over Network(s) 103 to Master Storage Array 102 and Slave Storage Array 132.

During operation of the components shown in FIG. 1, Master Storage Array 102, Slave Storage Array 132, and Remote Storage Array 162 provide data storage for use by one or more applications executing on Host Computer 100 to store data. In this regard, Master Storage Array 102, Slave Storage Array 132, and Remote Storage Array 162 provide at least one storage object to store data that is generated and/or used by the application or applications executing on Host Computer 100. The storage object may, for example, include or consist of a logical disk (LUN), and is stored using units of storage allocated from Disk Drive 110, Disk Drive 140, and Disk Drive 170. The disclosed techniques may also be applied to other specific types of storage objects, such as host file systems, and/or VVols (virtual volumes, such as a virtual machine disk, e.g., as available from VMware, Inc. of Palo Alto, Calif.).

As illustrated in FIG. 1, during an initial time period, prior to detection of a failure of or in Master Storage Array 102, and while Write Operations 184 that are directed to the storage object are received from Host Computer 100 by Master Storage Array 102 and/or Slave Storage Array 132, and while those received write operations are collected by Storage Service and Replication Logic 112 into a set of write cycles stored in Master Storage Array 102, shown by Write Cycles 114, and while the Write Cycles 114 stored in Master Storage Array 102 are transmitted by Master Storage Array 102 to Remote Storage Array 162 so that the write operations collected in Write Cycles 114 can be applied by Remote Storage Array 162 to Copy 182 of the storage object in order to provide replication of the storage object on Remote Storage Array 162, Storage Service and Replication Logic 142 collects the Write Operations 184 received by Master Storage Array 102 and Slave Storage Array 132 into a set of write cycles stored in Slave Storage Array 132, shown by Write Cycles 144.

Synchronous Replication 186 may be performed on the storage object between the Master Storage Array 102 and the Slave Storage Array 132 at least in part by, for each one of the write operations in Write Operations 184 directed to the storage that are received from Host Computer 100 by either Master Storage Array 102 and/or Slave Storage Array 132, applying the write operation on both i) a Copy 122 of the storage object stored in the Master Storage Array 102, and ii) a Copy 152 of the storage object stored in the Slave Storage Array 132, prior to acknowledging completion of the write operation to the Host Computer 100. Acknowledging completion of the write operation may, for example, include or consist of sending an acknowledgement message to Host Computer 100 indicating that the write operation has been completed. Application of write operations on Copy 122 of the storage object may be performed by Storage and Replication Logic 112, and application of write operations on Copy 152 may be performed by Storage and Replication Logic 142. In the case where a write operation directed to the storage object is received by Master Storage Array 102, Synchronous Replication 186 accordingly may include both applying the write operation to Copy 122 of the storage object and sending the write operation to Slave Storage Array 132 for application to Copy 152 of the storage object before sending an acknowledgement message to Host Computer 100 that acknowledges completion of the write operation. In the case where a write operation directed to the storage object is received by Slave Storage Array 132, Synchronous Replication 186 may include both applying the write operation to Copy 152 of the storage object and sending the write operation to Master Storage Array 102 for application to Copy 122 of the storage object before sending an acknowledgement message to Host Computer 100 that acknowledges completion of the write operation.

As described above, the Master Storage Array 102 and the Slave Storage Array 132 may both operate to receive Write Operations 184 directed to the storage object from Host Computer 100. In this way the disclosed system may be embodied to provide what is generally referred to as an "Active/Active" configuration, in which Host Computer 100 may access the storage object using one access path through Master Storage Array 102, and using another access path through Slave Storage Array 132. Accordingly, in an example of a use case, applying Write Operations 184 from Host Computer 100 and directed to the storage object may include applying i) at least one write operation from Host Computer 100 and directed to the storage object that is received by the Master Storage Array 102, and ii) at least one write operation from Host Computer 100 and directed to the storage object that is received by the Slave Storage Array 132, on both i) the Copy 122 of the storage object stored in the Master Storage Array 102, and ii) the Copy 152 of the storage object stored in the Slave Storage Array 132.

Collecting Write Operations 184 from Host Computer 100 into Write Cycles 114, e.g. by Storage Service and Replication Logic 112, may include collecting both i) write operations directed to the storage object and received by the Master Storage Array 102, and ii) write operations directed to the storage object and received by the Slave Storage Array 132, into the Write Cycles 114 stored in the Master Storage Array 102.

Collecting Write Operations 184 from Host Computer 100 into Write Cycles 144, e.g. by Storage Service and Replication Logic 142, may include collecting both i) write operations directed to the storage object and received by the Master Storage Array 102, and ii) write operations directed to the storage object and received by the Slave Storage Array 132, into the Write Cycles 144 stored in the Slave Storage Array 132.

Master Storage Array 102 (e.g. Storage Service and Replication Logic 112) may associate sequential cycle numbers with the write cycles in Write Cycles 114 stored in Master Storage Array 102 as the write operations in those write cycles are being collected, and Slave Storage Array 132 (e.g. Storage Service Replication Logic 142) may associate the same sequential cycle numbers with the write cycles stored in Write Cycles 144 stored in Slave Storage Array 132 as the write operations in those write cycles are being collected. While Write Operations 184 are received and are being collected into the Write Cycles 114 that are stored in the Master Storage Array 102, and are also being collected into the Write Cycles 144 that are stored in the Slave Storage Array 132, the Master Storage Array 102 (e.g. Storage Service and Replication Logic 112) controls the times at which the cycle number changes in both the Master Storage Array 102, and also the times at which the cycle number changes in the Slave Storage Array 132. The Master Storage Array 102 may accomplish this by, in response to occurrence of a new cycle trigger condition, incrementing the cycle number on the Master Storage Array 102, and then transmitting a new cycle number command over Network(s) 103 to the Slave Storage Array 132. Incrementing the cycle number on the Master Storage Array 102 causes subsequently received write operations to be collected into a write cycle in Write Cycles 114 that is associated with the incremented cycle number.

In response to receiving the new cycle number command from Master Storage Array 102, Slave Storage Array 132 increments the cycle number on Slave Storage Array 132, causing subsequently received write operations to be collected into a write cycle in Write Cycles 144 that is associated with the incremented cycle number.

Incrementing the cycle number on the Master Storage Array 102, and sending the new cycle number command to the Slave Storage Array 132 to cause the Slave Storage Array 132 to increment the cycle number on the Slave Storage Array 132 may, for example, be triggered by a new cycle trigger condition consisting of expiration of a cycle period timer on the Master Storage Array 102. Such a timer may be set to expire periodically, e.g. every fifteen seconds, resulting in each write cycle to contain write operations that are received within a corresponding fifteen second time period. Those skilled in the art will recognize that the disclosed techniques are not limited to use with fifteen second time periods for collecting write operations into write cycles, and that various other time periods may be used in the alternative based on specific requirements of a given deployment or operational environment.

During the initial time period illustrated in FIG. 1, prior to detection of a failure in or of Master Storage Array 102, Master Storage Array 102 transmits Write Cycles 114 to Remote Storage Array 162 for Replication Logic 172 to apply the write operations contained in those write cycles onto Copy 182 of the storage object, thus providing disaster protection for the storage object. For example, each write cycle in Write Cycles 114 may be transmitted individually to Remote Storage Array 162, and when Remote Storage Array 162 has successfully received a last write operation for a specific write cycle, Remote Storage Array 162 may transmit a message to Master Storage Array 102 indicating that all write operations in the write cycle have been successfully received by Remote Storage Array 162 and will be applied on Copy 182 of the storage object. When the Master Storage Array 102 receives a message from Remote Storage Array 162 indicating that all write operations in a given write cycle have been successfully received by Remote Storage Array 162 and will be applied on Copy 182 of the storage object, Master Storage Array 102 (e.g. Storage Service and Replication Logic 112) may respond by discarding the successfully received write cycle from Write Cycles 114 that are stored in Master Storage Array 102, e.g. by completely deleting all copies of that write cycle that may be stored in Master Storage Array 102. In the example of FIG. 1, Master Storage Array 102 has previously transmitted a write cycle associated with a cycle number of 1 to Remote Storage Array 162, and received a message indicating that all write operations in that write cycle were successfully received by Remote Storage Array 162 and will be applied on Copy 182 of the storage object. Accordingly, Storage Service and Replication Logic 112 has previously discarded a write cycle with a cycle number of 1 from Write Cycles 114.

In addition, in response to receiving a message indicating that all write operations in a given write cycle were successfully received by Remote Storage Array 162 and will be applied on Copy 182 of the storage object, Master Storage Array 102 (e.g. Storage Service and Replication Logic 112) transmits a discard command to Slave Storage Array 132. The discard command may include the cycle number of the write cycle for which all write operations were successfully received by Remote Storage Array 162 and will be applied on Copy 182 of the storage object, and that has previously been discarded from Write Cycles 114. When Slave Storage Array 132 receives the discard command, Storage Service and Replication Logic 142 responds by discarding a write cycle in Write Cycles 144 that is associated with a cycle number that is one less than the cycle number of the write cycle that was successfully received by the remote storage array from the first local storage array (e.g. one less than the cycle number contained in the discard command). As a result, the set of Write Cycles 144 stored in the slave storage array may accordingly be maintained on an ongoing basis such that it contains at least one more write cycle than is contained in the set of Write Cycles 114 stored in the master storage array. This is illustrated in FIG. 1 by Write Cycles 114 containing Write Cycle 2 116, Write Cycle 3, 118, and so on through Write Cycle N 120, while Write Cycles 144 contains Write Cycle 1 115, Write Cycle 2 116, and so on through Write Cycle N 120.

For example, in the case where Master Storage Array 102 transmits Write Cycle 2 116 to Remote Storage Array 162, and then subsequently receives a message from Remote Storage Array 162 indicating that all write operations in Write Cycle 2 116 were successfully received by Remote Storage Array 162 and will be applied on Copy 182 of the storage object, Master Storage Array 102 responds to the message by discarding Write Cycle 2 116 from Write Cycles 114, and transmitting a discard command containing a cycle number of 2 to Slave Storage Array 132. When Slave Storage Array 132 receives the discard command, Storage Service and Replication Logic 142 responds by discarding a write cycle in Write Cycles 144 that is associated with a cycle number that is one less than the cycle number contained in the discard command, i.e. Write Cycle 1 115. At that point Write Cycles 114 would contain a set of write cycles made up of Write Cycle 3 118 through Write Cycle N 120, and Write Cycles 144 would contain one more write cycle, i.e. Write Cycle 2 116 through Write Cycle N 120, where Write Cycle N 120 is a most recently collected write cycle.

In one embodiment, the process for Master Storage Array 102 to determine that all write operations in a given write cycle have been successfully received by Remote Storage Array 162 and will be applied on Copy 182 of the storage object may be as follows:

i) Remote Storage Array 162 sends an acknowledgement message to Master Storage Array 102 for each write operation in the write cycle that it successfully receives from Master Storage Array 102, and ii) When Master Storage Array 102 determines that it has received an acknowledgement message from Remote Storage Array 162 for every write operation in the write cycle, Master Storage Array 102 sends a message to Remote Storage Array 162 indicating that the write cycle is complete and can be committed to Copy 182 of the storage object. Remote Storage Array 162 then sends a message acknowledging successful receipt of the message indicating that the write cycle is complete and can be committed to Master Storage Array 102. In response to receipt of the message acknowledging successful receipt of the message indicating that the write cycle is complete and can be committed, Master Storage Array 102 discards the write cycle from Write Cycles 114, and transmits the discard command for the write cycle to Slave Storage Array 132.

Write Cycles 144 contains one more write cycle than Write Cycles 144 because Master Storage Array 102 and Slave Storage Array 132 do not share a common clock, and accordingly the time periods during which corresponding write cycles are collected in the two storage arrays are not exactly the same. Accordingly, the version of Write Cycle 2 116 contained in Write Cycles 114 may not contain the same exact set of write operations as are contained in the version of Write Cycle 2 116 contained in Write Cycles 144. By keeping one additional, older write cycle in Write Cycles 144, the disclosed techniques allow for replication of the storage object to Copy 182 on Remote Storage Array 162 to be seamlessly maintained in the event of a failure in or of Master Storage Array 102, as further described below, e.g. with reference to FIG. 3.

Figure 2:
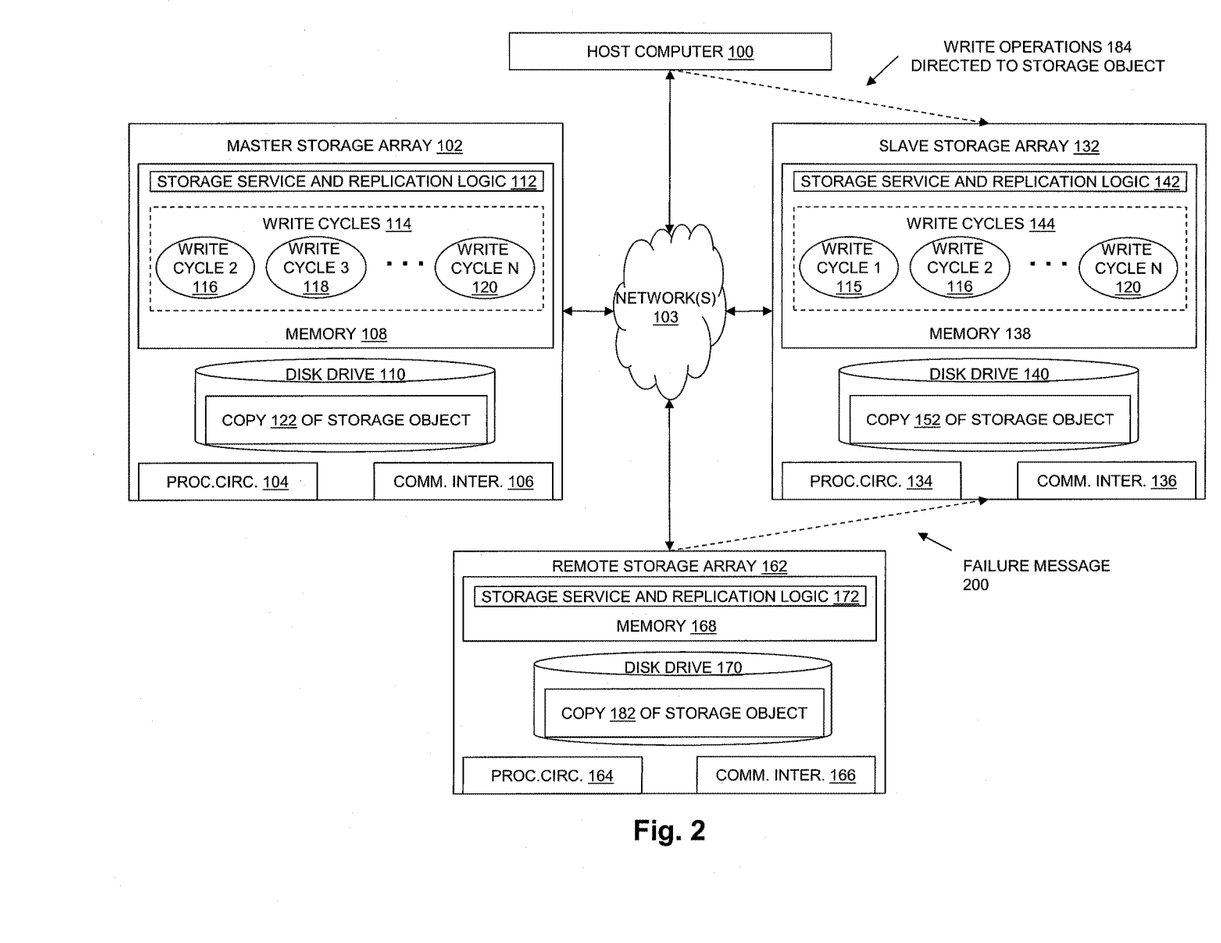
FIG. 2 is a block diagram showing the data storage environment of FIG. 1 after the initial time period, while operating to detect a failure of the master storage array.

FIG. 2 is a block diagram showing the data storage environment of FIG. 1 after the initial time period, while operating to detect a failure of the master storage array. As shown in FIG. 2, after the initial time period, a failure of or in the Master Storage Array 102 may occur, but Host Computer 100 may continue to access the storage object (e.g. through Write Operations 184) using the Copy 152 of the storage object that is stored in the Slave Storage Array 132. The failure of or in Master Storage Array 102 may be any specific type of failure, such as complete inoperability of Master Storage Array 102, loss of access to Master Storage Array 102, loss of access to Copy 122 of the storage object, failure of Disk Drive 110, and/or any other specific type of failure. The failure is detected by Slave Storage Array 132, in that Slave Storage Array 132 may detect the failure directly from Master Storage Array 102, and/or a failure message may be conveyed to Slave Storage Array 132 reporting the failure. The failure of or in Master Storage Array 102 may be detected while Host Computer 100 continues to access the storage object using Copy 152 of the storage object contained in Slave Storage Array 132.

In one embodiment, Remote Storage Array 162 is operable to detect the failure of or in Master Storage Array 102, e.g. based on losing communication connectivity with Master Storage Array 102, failure to receive a heartbeat signal from Master Storage Array 102 within a time limit, receipt of a failure message indicating the failure, and/or some other specific failure detection or notification technique. In such an embodiment, in response to detecting that Master Storage Array 102 has failed, Remote Storage Array 162 transmits Failure Message 200 to Slave Storage Array 132, indicating that the Master Storage Array 102 has failed. In this way, detecting the failure of the Master Storage Array 102 may include or consist of Slave Storage Array 132 receiving a failure message from the Remote Storage Array 162.

Figure 3:
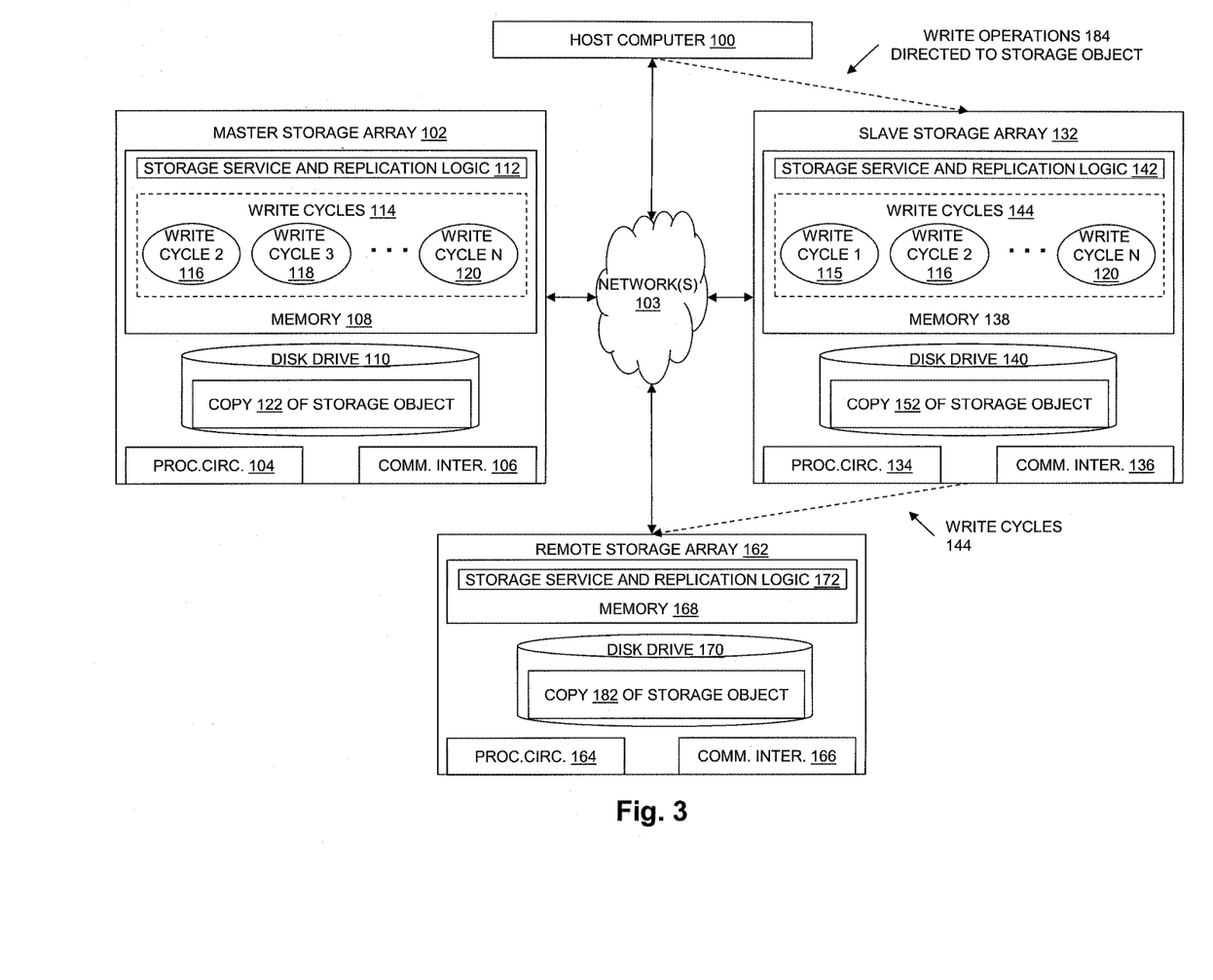
FIG. 3 is a block diagram showing the data storage environment of FIGS. 1-2 while responding to the failure detected in FIG. 2 and maintaining replication of a storage object on a remote storage array to seamlessly preserve disaster recovery protection for the storage object.

FIG. 3 is a block diagram showing the data storage environment of FIGS. 1-2 while responding to the failure of Master Storage Array 102 that was detected in FIG. 2, and maintaining replication of the storage object on Remote Storage Array 162 to seamlessly preserve disaster recovery protection for the storage object. As shown in FIG. 3, also while Host Computer 100 continues to access the storage object using Copy 152 of the storage object, and in response to detection of the failure of or in the Master Storage Array 102, Slave Storage Array 132 (e.g. Storage Service and Replication Logic 142) transmits Write Cycles 144 to Remote Storage Array 162. Upon receipt of Write Cycles 144, Remote Storage Array 162 (e.g. Storage and Replication Logic 142) applies the write operations contained in Write Cycles 144 on Copy 182 of the storage object, in order to seamlessly preserve disaster recovery protection for the storage object by seamlessly maintaining replication of the storage object on Remote Storage Array 162 in the event of a failure of or in Master Storage Array 102.

In another aspect of the disclosed techniques, transmitting Write Cycles 144 from the Slave Storage Array 132 to the Remote Storage Array 162 in response to a failure in or of the Master Storage Array 102 may include transmitting, from the Slave Storage Array 132 to the Remote Storage Array 162 as a single write cycle, i) a write cycle associated with a lowest cycle number in the slave storage array together with ii) a write cycle associated with a second lowest cycle number in the slave storage array. For example, with reference to FIG. 3, in response to detecting that Master Storage Array 102 has failed in some way, Slave Storage Array 184 may then first transmit a single write cycle to Remote Storage Array 162 that is a combination of all the write operations in the versions of Write Cycle 1 115 and Write Cycle 2 116 in Write Cycles 144, and having a cycle number of 2. In this way the disclosed techniques compensate for the fact that Slave Storage Array 132 and Master Storage Array 102 do not share a single clock, and accordingly that the version of Write Cycle 2 116 in the Write Cycles 114 may contain one or more write operations that are contained in the version of Write Cycle 1 115 in Write Cycles 144 stored in Slave Storage Array 132. After initially transmitting a single write cycle containing the write operations in both i) a write cycle in Write Cycles 144 associated with a lowest cycle number in the Slave Storage Array 132, and ii) a write cycle in Write Cycles 144 associated with a second lowest cycle number in the Slave Storage Array 132, the disclosed techniques accommodate the fact that time periods during which write operations are collected into correspondingly numbered write cycles on Master Storage Array 102 and Slave Storage Array 132 are not completely synchronized. After transmission of such an initial composite write cycle, the following write cycles in Write Cycles 144 are transmitted from Slave Storage Array 132 to Remote Storage Array 162, e.g. a write cycle associated with cycle number 3, followed by a write cycle associated with cycle number 4, and so on. The Slave Storage Array 132 may then seamlessly become a new master storage array, performing the functions performed by Master Storage Array 102 during the initial time period, prior to the failure in or of Master Storage Array 102, including replication of the storage object to Remote Storage Array 162 to provide disaster recovery protection for the storage object.

Figure 4:
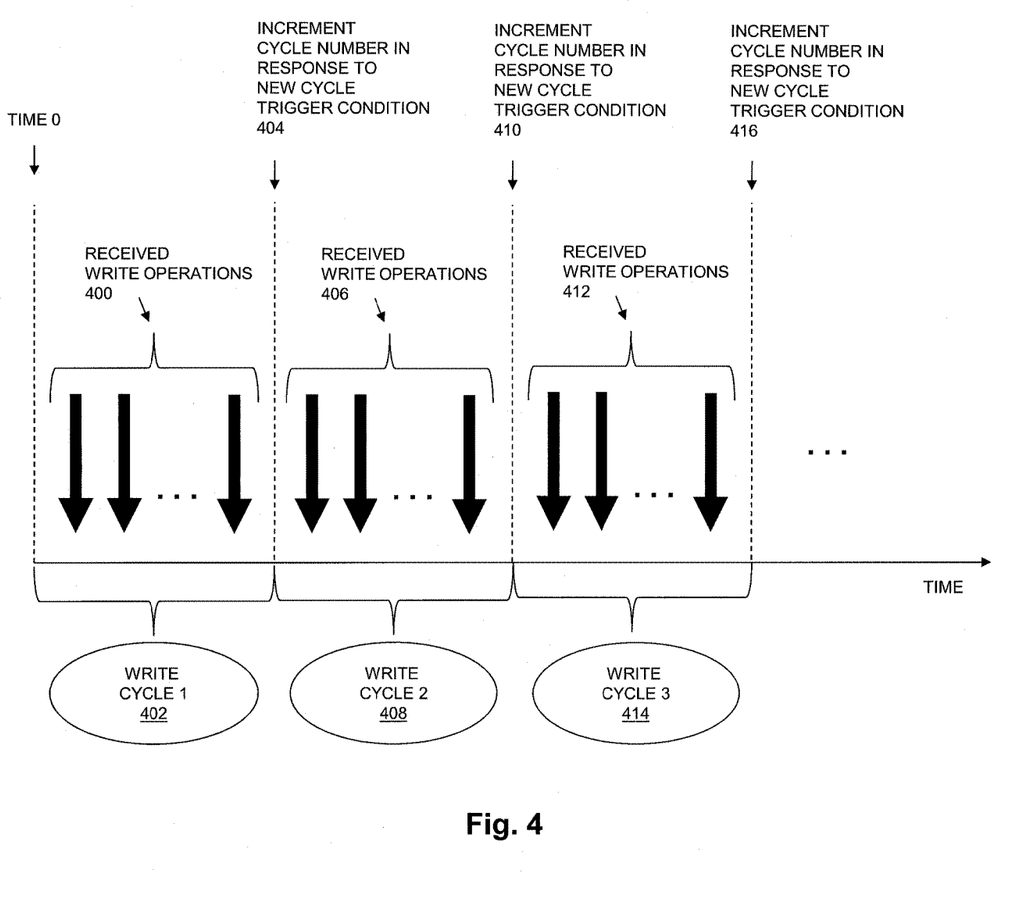
FIG. 4 illustrates how host write operations may be collected into write cycles on the master local storage array.

FIG. 4 illustrates how host write operations may be collected into write cycles on a master storage array. As shown in FIG. 4, Write Operations 400 that are received between Time 0 and the occurrence of a New Cycle Trigger Condition 404 are collected into Write Cycle 1 402. In response to New Cycle Trigger Condition 404, before incrementing the cycle number, the master storage array checks to see if there are any write operations that were collected into the preceding write cycle that are still ongoing. Since Write Cycle 1 402 is the first write cycle collected in the example, there is no preceding write cycle, and the cycle number is incremented to 2. The Write Operations 406 that are received after the cycle number is incremented to 2, and until the cycle number is later incremented to 3 in response to New Cycle Trigger Condition 410, are collected into Write Cycle 2 408. Again, in response to New Cycle Trigger Condition 410, before incrementing the cycle number, the master storage array checks to see if there are any write operations that were collected into the preceding write cycle that are still ongoing. In this case, if there are any write operations that were collected into Write Cycle 1 402 that are still ongoing, those write operations are completed before the cycle number is incremented form 2 to 3. The Write Operations 412 that are received after the cycle number is incremented to 3, until the cycle number is later incremented to 4 in response to New Cycle Trigger Condition 416, are collected into Write Cycle 3 414. The process continues as write operations continue to be received in order to continue collecting write operations into write cycles on the master storage array. As mentioned above, in one embodiment, the new cycle trigger conditions 404, 410, 416, and so on, may consist of or include expiration of a cycle period timer or the like on the master storage array.

Figure 5:
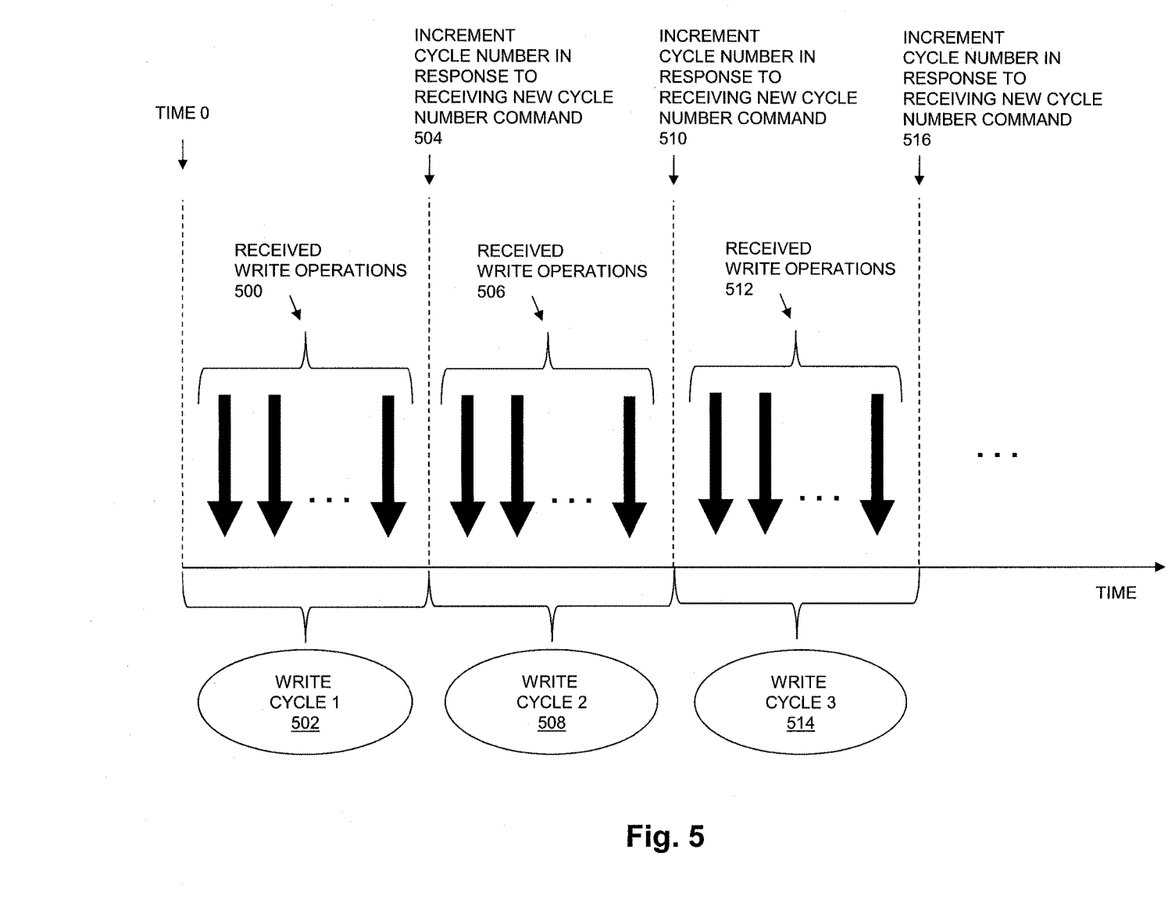
FIG. 5 illustrates how host write operations may be collected into write cycles on the slave local storage array.

FIG. 5 illustrates how host write operations may be collected into a set of write cycles on a slave storage array. As shown in FIG. 5, Write Operations 500 that are received between Time 0 and receiving New Cycle Number Command 504 are collected into Write Cycle 1 502. In response to receipt of New Cycle Number Command 504, before incrementing the cycle number, Slave Storage Array 132 checks to see if there are any write operations that were collected into the preceding write cycle that are still ongoing. Since Write Cycle 1 502 is the first write cycle collected in the example, there is no preceding write cycle, and the cycle number is incremented to 2. The Write Operations 506 that are received after the cycle number is incremented to 2, and until the cycle number is later incremented to 3 in response to receiving New Cycle Number Command 510, are collected into Write Cycle 2 508. Again, in response to New Cycle Number Command 510, before incrementing the cycle number from 2 to 3, Slave Storage Array 132 checks to see if there are any write operations that were collected into the preceding write cycle that are still ongoing. In this case, if there are any write operations that were collected into Write Cycle 1 502 that are still ongoing, those write operations are completed before the cycle number is incremented from 2 to 3. The Write Operations 512 that are received after the cycle number is incremented to 3, and until the cycle number is later incremented to 4 in response to receipt of New Cycle Number Command 516, are collected into Write Cycle 3 514. The process continues as write operations continue to be received in order to continue collecting write operations into write cycles on the slave storage array. As mentioned above, in one embodiment, the new cycle number commands may be received by the slave storage array from the master storage array.

Figure 6:
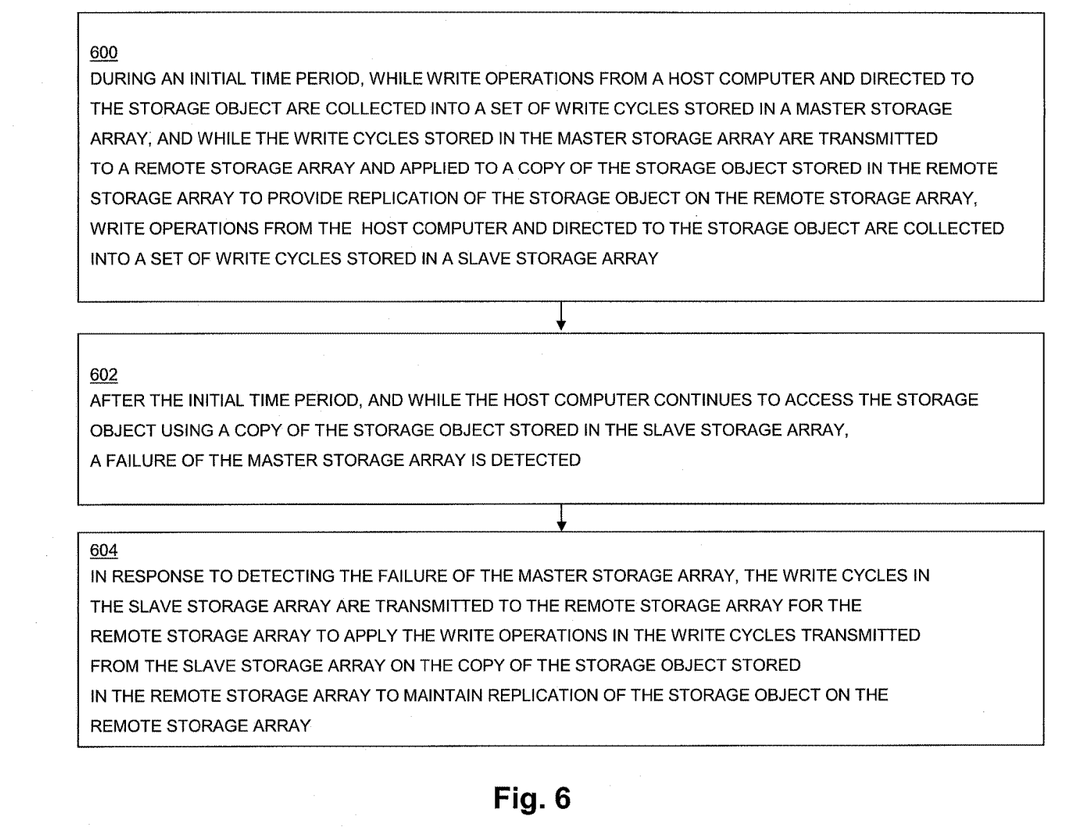
FIG. 6 is a flow chart illustrating steps in a method of carrying out the disclosed techniques for preserving disaster recovery protection for a storage object.

FIG. 6 is a flow chart illustrating steps in a method of carrying out the disclosed techniques for preserving disaster recovery protection for a storage object. At step 600, during an initial time period, while write operations from a host computer and directed to the storage object are collected into a set of write cycles stored in a master storage array, and while the write cycles stored in the master storage array are transmitted to a remote storage array and applied to a copy of the storage object stored in the remote storage array to provide replication of the storage object on the remote storage array, write operations from the host computer and directed to the storage object are collected into a set of write cycles stored in a slave storage array.

At step 602, after the initial time period, and while the host computer continues to access the storage object using a copy of the storage object stored in the slave storage array, a failure of the master storage array is detected.

At step 604, in response to detecting the failure of the master storage array, the write cycles in the slave storage array are transmitted to the remote storage array for the remote storage array to apply the write operations in the write cycles transmitted from the slave storage array on the copy of the storage object stored in the remote storage array to maintain replication of the storage object on the remote storage array.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of preserving disaster recovery protection for a storage object, comprising:
    during an initial time period, while write operations from a host computer and directed to the storage object are collected into a set of write cycles stored in a first local storage array, and while the write cycles stored in the first local storage array are transmitted to a remote storage array and applied to a copy of the storage object stored in the remote storage array to provide replication of the storage object on the remote storage array, collecting the write operations from the host computer and directed to the storage object into a set of write cycles stored in a second local storage array;
    after the initial time period, and while the host computer continues to access the storage object using a copy of the storage object stored in the second local storage array, detecting a failure of the first local storage array;
    in response to detecting the failure of the first local storage array, transmitting the write cycles in the second local storage array to the remote storage array for the remote storage array to apply the write operations in write cycles transmitted from the second local storage array on the copy of the storage object stored in the remote storage array to maintain replication of the storage object on the remote storage array;
    wherein the first local storage array associates sequential cycle numbers with the write cycles stored in the first local storage array;

wherein the second local storage array associates the sequential cycle numbers with the write cycles in the second local storage array;

wherein the first local storage array, in response to receiving an indication from the remote storage array that all write operations in a write cycle transmitted from the first local storage array have been successfully received by the remote storage array, discards the successfully received write cycle from the write cycles stored in the first local storage array, and transmits a discard command to the second local storage array causing the second local storage array to discard a write cycle in the write cycles stored in the second local storage array that is associated with a cycle number that is one less than the cycle number of the write cycle that was successfully received by the remote storage array from the first local storage array; and wherein a total number of write cycles stored in the second local storage array is at least one greater than a total number of write cycles stored in the first local storage array.

2. The method of claim 1, further comprising performing synchronous replication of the storage object on the first local storage array and the second local storage array at least in part by, for each write operation received from the host computer and directed to the storage object, applying the write operation on both i) a copy of the storage object stored in the first local storage array, and ii) the copy of the storage object stored in the second local storage array, prior to acknowledging completion of the write operation to the host computer.

3. The method of claim 2, wherein the first local storage array and the second local storage array both operate to receive write operations directed to the storage object; and wherein applying each write operation from the host computer and directed to the storage object includes applying i) at least one write operation from the host computer and directed to the storage object that is received by the first local storage array and ii) at least one write operation from the host computer and directed to the storage object that is received by the second local storage array, on both i) the copy of the storage object stored in the first local storage array, and ii) the copy of the storage object stored in the second local storage array.

4. The method of claim 3, wherein collecting write operations from the host computer and directed to the storage object into the set of write cycles stored in the first local storage array includes collecting both i) write operations directed to the storage object received by the first local storage array, and ii) write operations directed to the storage object received by the second local storage array, into the set of write cycles stored in the first local storage array; and wherein collecting write operations from the host computer and directed to the storage object into the set of write cycles stored in the second local storage array includes collecting both i) write operations directed to the storage object received by the first local storage array, and ii) write operations directed to the storage object received by the second local storage array, into the set of write cycles stored in the second local storage array.

5. The method of claim 4, further comprising:
while the write cycles from the host computer and directed to the storage object are being collected into the write cycles stored in the first local storage array and into the write cycles stored in the second local storage array, the first local storage array controls when cycle number changes occur in both the first local storage array and the second local storage array by, in response to a new cycle trigger condition, incrementing the cycle number on the first local storage array, and then sending a new cycle number command to the second local storage array causing the second local storage array to increment the cycle number on the second local storage array.

6. The method of claim 5, further comprising:
detecting expiration of a cycle period timer on the first local storage array; and
wherein the new cycle trigger condition comprises expiration of the cycle period timer on the first local storage array.

7. The method of claim 1, wherein transmitting the write cycles from the second local storage array to the remote storage array includes transmitting, to the remote storage array as a single write cycle, i) a write cycle associated with a lowest cycle number of the cycle numbers associated with the write cycles stored in the second local storage array with ii) a write cycle associated with a second lowest cycle number of the cycle numbers associated with the write cycles stored in the second local storage array.

8. The method of claim 7, further comprising:
wherein the remote storage array is operable to detect failure of the first local storage array and to transmit a failure message to the second local storage array indicating that the first local storage array has failed; and
wherein detecting the failure of the first local storage array includes receiving the failure message from the remote storage array at the second local storage array.

9. A computer program product, comprising:
at least one non-transitory computer readable medium storing program code for preserving disaster recovery protection for a storage object, the program code, when executed by processing circuitry, causing the processing circuitry to:
during an initial time period, while write operations from a host computer and directed to the storage object are collected into a set of write cycles stored in a first local storage array, and while the write cycles stored in the first local storage array are transmitted to a remote storage array and applied to a copy of the storage object stored in the remote storage array to provide replication of the storage object on the remote storage array, collect the write operations from the host computer and directed to the storage object into a set of write cycles stored in a second local storage array,
after the initial time period, and while the host computer continues to access the storage object using a copy of the storage object stored in the second local storage array, detect a failure of the first local storage array,
in response to detection of the failure of the first local storage array, transmit the write cycles in the second local storage array to the remote storage array and to cause the write operations in the write cycles transmitted from the second local storage array to be applied on the copy of the storage object stored in the remote storage array to maintain replication of the storage object on the remote storage array,
associate sequential cycle numbers with the write cycles stored in the first local storage array,
associate the sequential cycle numbers with the write cycles in the second local storage array, and in the first local storage array, in response to receiving an indication from the remote storage array that all write operations in a write cycle transmitted from the first local storage array have been successfully received by the remote storage array, discard the successfully received write cycle from the write cycles stored in the first local storage array, and transmits a discard command to the second local storage array causing the second local storage array to discard a write cycle in the write cycles stored in the second local storage array that is associated with a cycle number that is one less than the cycle number of the write cycle that was successfully received by the remote storage array from the first local storage array; and wherein a total number of write cycles stored in the second local storage array is at least one greater than a total number of write cycles stored in the first local storage array.

10. The computer program product of claim 9, wherein the program code, when executed by the processing circuitry, further causes the processing circuitry to perform synchronous replication of the storage object on the first local storage array and the second local storage array at least in part by, for each write operation received from the host computer and directed to the storage object, applying the write operation on both i) a copy of the storage object stored in the first local storage array, and ii) the copy of the storage object stored in the second local storage array, prior to acknowledging completion of the write operation to the host computer.

11. The computer program product of claim 10, wherein the program code, when executed by the processing circuitry, further causes the processing circuitry to:

cause the first local storage array and the second local storage array to both operate to receive write operations directed to the storage object; and apply each write operation from the host computer and directed to the storage object includes at least in part by applying i) at least one write operation from the host computer and directed to the storage object that is received by the first local storage array and ii) at least one write operation from the host computer and directed to the storage object that is received by the second local storage array, on both i) the copy of the storage object stored in the first local storage array, and ii) the copy of the storage object stored in the second local storage array.

12. The computer program product of claim 11, wherein the program code, when executed by the processing circuitry, further causes the processing circuitry to:

collect write operations from the host computer and directed to the storage object into the set of write cycles stored in the first local storage array at least in part by collecting both i) write operations directed to the storage object received by the first local storage array, and ii) write operations directed to the storage object received by the second local storage array, into the set of write cycles stored in the first local storage array; and collect write operations from the host computer and directed to the storage object into the set of write cycles stored in the second local storage array at least in part by collecting both i) write operations directed to the storage object received by the first local storage array, and ii) write operations directed to the storage object received by the second local storage array, into the set of write cycles stored in the second local storage array.

13. The computer program product of claim 12, wherein the program code, when executed by the processing circuitry, further causes the processing circuitry to:

while the write cycles from the host computer and directed to the storage object are being collected into the write cycles stored in the first local storage array and into the write cycles stored in the second local storage array, the control when cycle number changes occur in both the first local storage array and the second local storage array by, in response to a new cycle trigger condition, cause the first local storage array to increment the cycle number on the first local storage array, and then sending a new cycle number command to the second local storage array causing the second local storage array to increment the cycle number on the second local storage array.

14. The computer program product of claim 13, wherein the program code, when executed by the processing circuitry, further causes the processing circuitry to:

detect expiration of a cycle period timer on the first local storage array; and wherein the new cycle trigger condition comprises expiration of the cycle period timer on the first local storage array.

15. The computer program product of claim 9, wherein the program code, when executed by the processing circuitry, further causes the processing circuitry to:

transmit the write cycles from the second local storage array to the remote storage array at least in part by transmitting, to the remote storage array as a single write cycle, i) a write cycle associated with a lowest cycle number of the cycle numbers associated with the write cycles stored in the second local storage array with ii) a write cycle associated with a second lowest cycle number of the cycle numbers associated with the write cycles stored in the second local storage array.

16. The computer program product of claim 15, wherein the program code, when executed by the processing circuitry, further causes the processing circuitry to:

detect failure of the first local storage array at the remote storage array and cause the remote storage array to transmit a failure message to the second local storage array indicating that the first local storage array has failed; and detect the failure of the first local storage array at least in part by receiving the failure message from the remote storage array at the second local storage array.

17. A system comprising:

processing circuitry;

at least one memory having program code stored thereon, wherein the program code, when executed by the processing circuitry, causes the processing circuitry to during an initial time period, while write operations from a host computer and directed to the storage object are collected into a set of write cycles stored in a first local storage array, and while the write cycles stored in the first local storage array are transmitted to a remote storage array and applied to a copy of the storage object stored in the remote storage array to provide replication of the storage object on the remote storage array, collect the write operations from the host computer and directed to the storage object into a set of write cycles stored in a second local storage array, after the initial time period, and while the host computer continues to access the storage object using a copy of the storage object stored in the second local storage array, detect a failure of the first local storage array, in response to detecting the failure of the first local storage array, transmit the write cycles in the second local storage array to the remote storage array for the remote storage array to apply the write operations in write cycles transmitted from the second local storage array on the copy of the storage object stored in the remote storage array to maintain replication of the storage object on the remote storage array, associate sequential cycle numbers with the write cycles stored in the first local storage array, associate the sequential cycle numbers with the write cycles in the second local storage array, and in the first local storage array, in response to receiving an indication from the remote storage array that all write operations in a write cycle transmitted from the first local storage array have been successfully received by the remote storage array, discard the successfully received write cycle from the write cycles stored in the first local storage array, and transmits a discard command to the second local storage array causing the second local storage array to discard a write cycle in the write cycles stored in the second local storage array that is associated with a cycle number that is one less than the cycle number of the write cycle that was successfully received by the remote storage array from the first local storage array; and wherein a total number of write cycles stored in the second local storage array is at least one greater than a total number of write cycles stored in the first local storage array.

* * * * *